United States Patent
Sugi et al.

(10) Patent No.: US 12,468,301 B2
(45) Date of Patent: Nov. 11, 2025

(54) WORKING ROBOT SYSTEM

(71) Applicant: YAMABIKO CORPORATION, Tokyo (JP)

(72) Inventors: Kentaro Sugi, Tokyo (JP); Haruka Ishihira, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 232 days.

(21) Appl. No.: 18/319,855

(22) Filed: May 18, 2023

(65) Prior Publication Data

US 2024/0385618 A1 Nov. 21, 2024

Related U.S. Application Data

(63) Continuation of application No. PCT/JP2020/046136, filed on Dec. 10, 2020.

(51) Int. Cl.
*G05D 1/00* (2024.01)
*A01D 34/00* (2006.01)
(Continued)

(52) U.S. Cl.
CPC ......... *G05D 1/0214* (2013.01); *A01D 34/008* (2013.01); *A63B 47/02* (2013.01);
(Continued)

(58) Field of Classification Search
CPC .... G05D 1/0214; G05D 1/0257; G05D 1/247; G05D 1/637; A01D 34/008; A01D 34/64; A01D 2101/00; A63B 47/02
See application file for complete search history.

(56) References Cited

U.S. PATENT DOCUMENTS

| | | | |
|---|---|---|---|
| 5,017,415 A * | 5/1991 | Cosman | F16L 1/11 |
| | | | 324/67 |
| 6,255,793 B1 * | 7/2001 | Peless | G01C 22/00 |
| | | | 318/580 |

(Continued)

FOREIGN PATENT DOCUMENTS

| | | | |
|---|---|---|---|
| EP | 3067771 A1 | 9/2016 | |
| EP | 3657202 A2 * | 5/2020 | ........... G01S 13/876 |

(Continued)

OTHER PUBLICATIONS

Office of Engineering and Technology, Bulletin No. 70. Federal Communications Commission (FCC), US Dept. of Commerce. Jul. 1997, retrieved Feb. 27, 2025 (Year: 1997).*

(Continued)

*Primary Examiner* — Kito R Robinson
*Assistant Examiner* — Zachary E. F. Glade
(74) *Attorney, Agent, or Firm* — BACON & THOMAS, PLLC

(57) ABSTRACT

A working robot system includes a working robot configured to perform work while autonomously traveling, and a non-energization wire configured to partition a working area or an active area of the working robot. The working robot includes a wire detector configured to detect the wire. The working robot system includes a controller configured to control the working robot to autonomously travel within a area partitioned by the wire, based on a detection signal from the wire detector.

9 Claims, 9 Drawing Sheets

(51) Int. Cl.
*A01D 34/64* (2006.01)
*A01D 101/00* (2006.01)
*A63B 47/02* (2006.01)
*G05D 1/244* (2024.01)

(52) U.S. Cl.
CPC .......... *G05D 1/0257* (2013.01); *G05D 1/244* (2024.01); *A01D 34/64* (2013.01); *A01D 2101/00* (2013.01)

(56) References Cited

U.S. PATENT DOCUMENTS

| | | | |
|---|---|---|---|
| 11,714,411 B2 | 8/2023 | Muro et al. | |
| 2017/0153648 A1* | 6/2017 | Sjöholm | .............. G05D 1/0265 |

FOREIGN PATENT DOCUMENTS

| | | |
|---|---|---|
| JP | 59-122605 | 8/1984 |
| JP | S61-169908 A | 7/1986 |
| JP | S63-311413 A | 12/1988 |
| JP | 2008-129696 A | 6/2008 |
| JP | 2013-164742 A | 8/2013 |
| JP | 2016-152003 A | 8/2016 |
| JP | WO2019-180765 A1 | 9/2019 |
| WO | WO-0038029 A1 * | 6/2000 ........... A47L 9/2852 |

OTHER PUBLICATIONS

"Wirefy 100 PCS Non Insulated Butt Connectors Kit" found on Amazon.com [https://www.amazon.com/Wirefy-Non-Insulated-Butt-Connectors/dp/B08BYY3KDB?gQT=1&th=1], available Jun. 28, 2020, accessed Mar. 3, 2025 (Year: 2020).*
Search Report dated Mar. 14, 2024 in corresponding Japanese Appln. No. PCT/JP2020/046136.
Japanese OA cited in corresponding Appln. 2022-567989 along with translation dated Jul. 10, 2024.
Written Opinion of the ISA cited in corresponding International Appln. PCT/JP2020/046136 along with translation, dated Mar. 2, 2021.
Japanese Official Action cited in corresponding International Appln. No. 2022-567989 dated Sep. 20, 2024 along with English translation.
International Search Report cited in corresponding Japanese Appln. No. PCT/JP2020/046136 dated Feb. 15, 2021.

* cited by examiner

WORKING ROBOT SYSTEM

CROSS-REFERENCE TO RELATED APPLICATIONS

The present application is a continuation application of PCT International Application No. PCT/JP 2020/046136 filed on Dec. 10, 2020, and the entire contents of which are hereby incorporated by reference.

BACKGROUND

1. Technical Field

The present invention relates to a working robot system.

2. Related Art

Conventionally, there has been known a working robot configured to perform lawn mowing while autonomously traveling. For this working robot, the boundary of an area is determined to perform the work within the area, or the range of activity is limited within the area.

For the conventional working robot, an area required for the working robot to work (working area) is surrounded by using a conductive wire. The conductive wire is connected to a power supply facility configured to charge the working robot, and electricity is conducted through the conductive wire to release a magnetic field around the conductive wire. A magnetic sensor is attached to the front end of the working robot to detect the magnetic field released from the conductive wire conducting the electricity. By this means, the working robot recognizes the working area surrounded by the conductive wire to perform the work within the area (see, for example, Japanese Patent Application Laid-Open No. 2013-164742). The entire contents of this disclosure are hereby incorporated by reference.

SUMMARY

A working robot system according to the present invention includes a working robot configured to perform work while autonomously traveling, and a non-energization wire configured to partition a working area or an active area of the working robot. The working robot includes a wire detector configured to detect the wire. The working robot system includes a controller configured to control the working robot to autonomously travel within an area partitioned by the wire, based on a detection signal from the wire detector.

DETAILED DESCRIPTION

With the conventional technology described in Japanese Patent Application Laid-Open No. 2013-164742, the power supply facility connected to the conductive wire is broken down due to lightning strike and so forth, so that it is not possible to conduct the conductive wire, or the electric conduction of the conductive wire is broken at breaking or blackout. In this case, the conventional working robot described above cannot recognize the boundary of the working area because the magnetic field released from the wire disappears, and therefore cannot continue the work. Meanwhile, there has been known a working robot configured to recognize the area by using a transmission facility (beacon). Also in this case, when battery exhaustion or breakdown occurs in the beacon, the working robot cannot recognize the area, and therefore cannot continue the work.

The present invention has been achieved to solve the above-described problem. It is therefore an object of the invention to solve the problem that the working robot cannot recognize the area when breakdown or blackout of the power supply facility occurs, and to allow the working robot to continue the work in a stable manner.

Hereinafter, embodiments of the present invention will be described with reference to the drawings. In the description below, the same reference numbers in the different drawings indicate the same functional parts, and therefore repeated description for each of the drawings is omitted.

Figure 1:
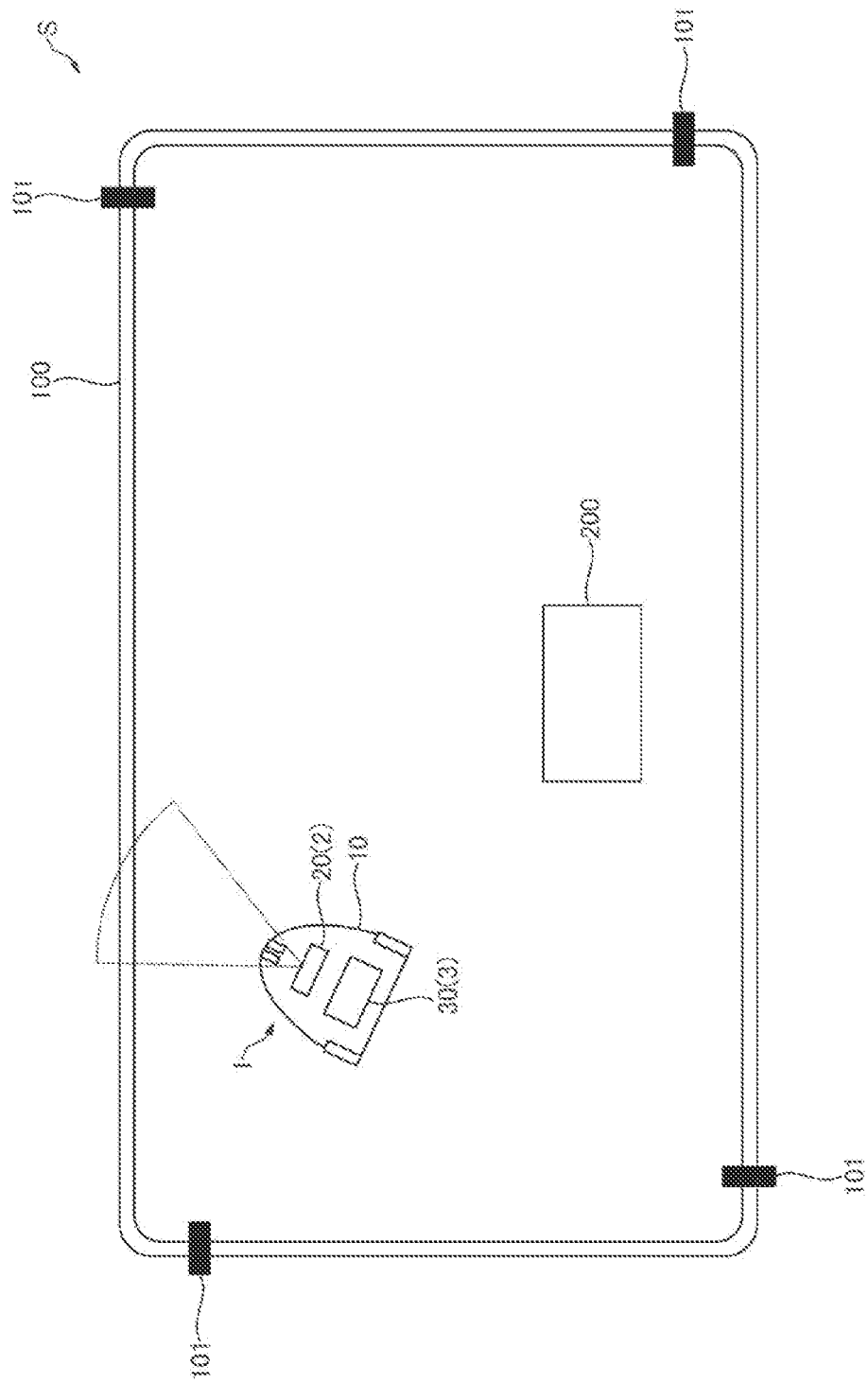
FIG. 1 illustrates a working robot system according to an embodiment of the invention.
Figure 2:
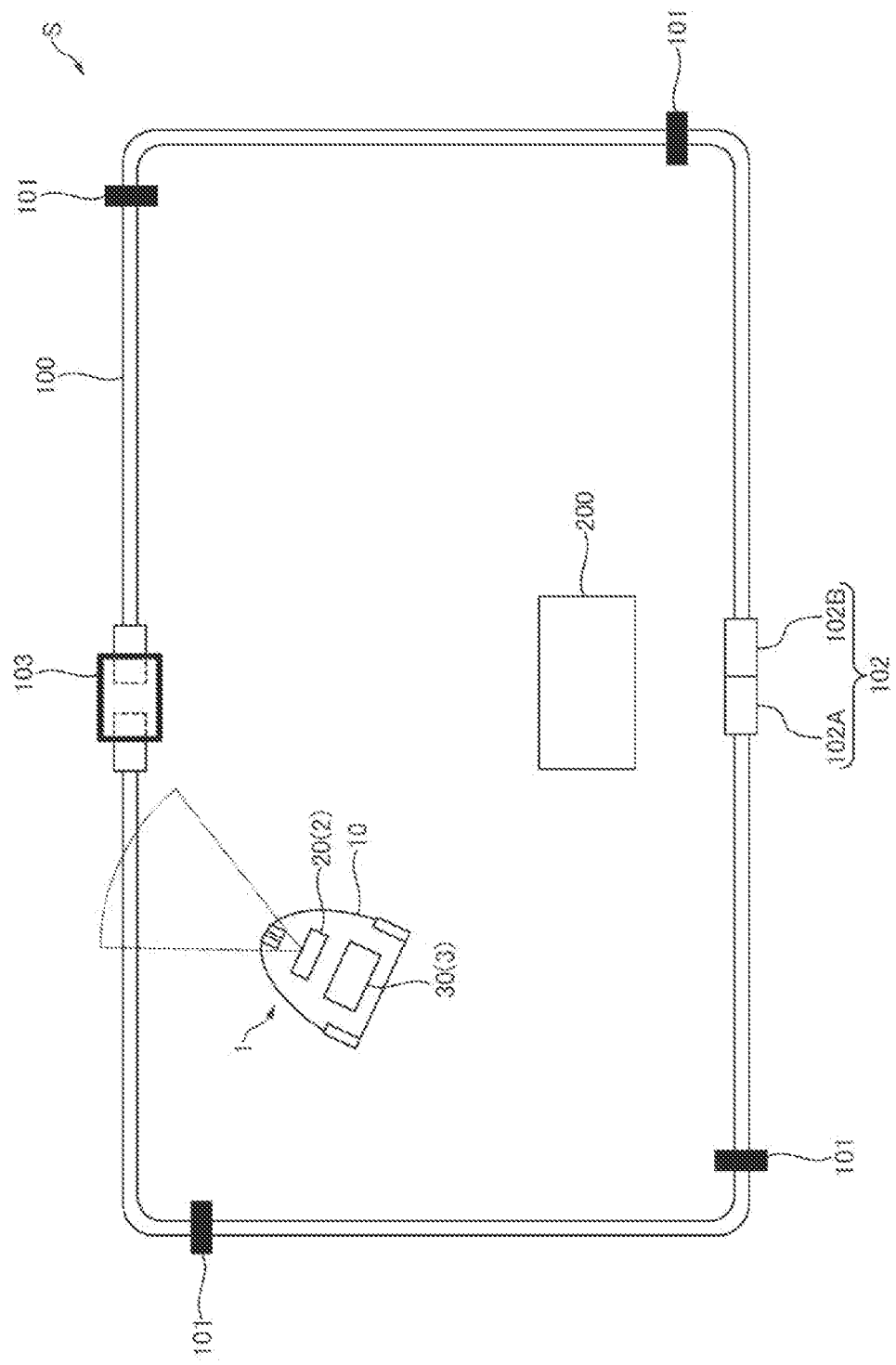
FIG. 2 illustrates the working robot system according to an embodiment of the invention.
Figure 3:
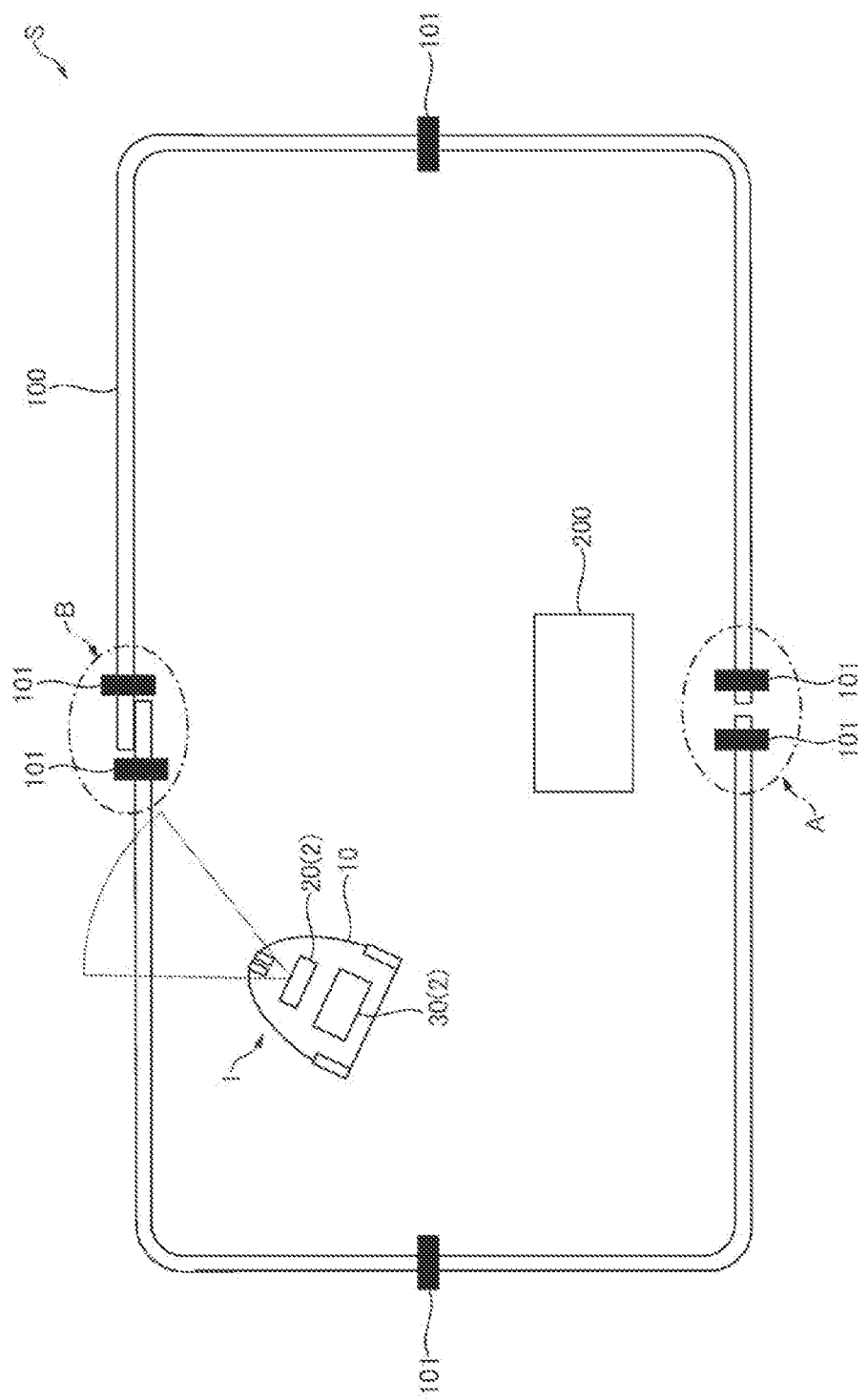
FIG. 3 illustrates the working robot system according to an embodiment of the invention.

As illustrated in FIG. 1 to FIG. 3, a working robot system S according to an embodiment of the invention includes a working robot 1 configured to perform work while autonomously traveling, and a wire 100 configured to partition a working area or an active area of the working robot 1. Here, the working area is an area in which the working robot 1 performs work, and the active area is an area in which activities of the working robot 1, including the traveling in and out of the working area, are permitted.

The working robot 1 is configured to perform work in, for example, a construction site, a ridge, an orchard, a mountain, a grassland, a garden, and a sports practice area. The kinds of work are not particularly limited, but the working robot 1 may be a lawn mower to perform lawn mowing, a grass mower to mow grass such as weeds, and a ball picker to collect balls.

The wire 100 is a non-energization wire. Here, "non-energization" means "electricity is not conducted", and therefore there is no need to be electrically connected to a power supply facility. A charging station (power supply facility) 200 configured to charge the working robot 1 may be provided in the area surrounded by the wire 100. Also in this case, the wire 100 is not electrically connected to the charging station 200.

The wire 100 may be endless as illustrated in FIG. 1, or may have one end and the other end as illustrated in FIG. 2 and FIG. 3. When the area is surrounded by the wire 100, one area may be surrounded by using one wire 100 as illustrated in FIG. 1 and FIG. 2, or by using more than one (at least two) wires 100 having ends as illustrated in FIG. 3.

As to the connection type of the wire 100 having ends, connectors 102 (102A, 102B) may be provided at the ends, respectively, to connect the ends to one another as illustrated in FIG. 2; the ends may be fixed by one or more fixing members 101 as illustrated in FIG. 3; the ends may be close to but spaced from one another as illustrated in FIG. 3-A; or the ends may overlap one another as illustrated in FIG. 3-B.

As illustrated in FIG. 2, when the connectors 102 are provided to connect the ends to one another, for example, a male screw is provided at one (connector 102A) of the connectors connected to one another, and a female screw is provided at the other (connector 102B) to connect the ends to one another; a clip is provided at one (connector 102A) or the other (connector 102B) of the connectors to connect the ends to one another; or, for example, a coupler may be used such that one end is inserted into a sleeve connection member from one side, and the other end is inserted into the sleeve connection member from the other side to connect the ends to one another.

The wire 100 may be provided on a working surface on which the working robot 1 performs the work, which is a flat surface or an inclined surface on the ground. In addition, part or the whole of the wire 100 may be provided in the ground. When the wire 100 is provided, the wire 100 may not be fixed so as to allow it to be easily installed, removed, and reinstalled, or may be fixed so as not to be easily moved.

When the wire 100 is provided in a fixed condition, the working robot system S includes fixing members 101 to fix the wire 100. For example, the fixing members 101 configured to mechanically fix the wire 100 to the ground may be used. When the wire 100 is an endless wire, the fixing members 101 are dispersed at predetermined intervals as illustrated in FIG. 1, and by this means, part of the wire 100 can be fixed to the ground.

Meanwhile, when the wire 100 has ends, it is preferred that, in particular, one end and the other end of the wire 100 are fixed to one another by the fixing members 101 as illustrated in FIG. 2 and FIG. 3. By this means, it is possible to solve such a trouble that the leg of a manager touches an end of the wire 100 to move the end, and therefore the distance between the ends becomes too large. Pegs may be used as the fixing members 101 to make it easy to remove and reinstall the wire 100. In addition, when the wire 100 has ends, one end and the other end of the wire 100 may be fixed to one another by a fixing part 103 different from the fixing members 101 as illustrated in FIG. 2.

The wire 100 may have any form, such as a flexible form and a rigid form. Here, when the flexible wire 100 is used, it is possible to optionally set the shape of the area surrounded by the wire 100.

As to the type of usage of the wire 100, the wire 100 may be permanently provided, or temporarily provided only during the work, to surround the area. As an example of the type of usage, when a relatively narrow working area is set in each case, the flexible wire 100 may be used in such a way that: the area targeted for the work is optionally specified before the work, and the wire 100 is provided there; and then, after this work is finished, another working area is optionally specified, and the wire 100 is moved there.

In FIG. 1 to FIG. 3, the working robot 1 includes conventionally known components that allow autonomous travel, and in addition, includes a wire detector 2 configured to detect the wire 100. The working robot system S includes a controller 3 configured to control the working robot 1 to autonomously travel within the area surrounded by the wire 100 based on a detection signal from the wire detector 2.

With the illustrated example, a sensor unit 20 is provided at the front end of the working robot 1, and includes the wire detector 2. In addition, a controller 30 is provided in a body 10 of the working robot 1 as the controller 3 of the working robot system S. However, this is by no means limiting, but the controller 3 of the working robot system S may be installed in a station (for example, the charging station 200 any management and other station (not illustrated)) to remotely control the working robot 1.

The wire detector 2 will be described. The wire detector 2 may not be limited as long as it allows the controller 3 to recognize the presence of the non-energization wire 100. As an example, a wire detection sensor configured to transmit a detection wave to the wire 100 and receive a reflected wave from the wire 100 may be used. The wire detection sensor is a sensor configured to detect the non-energization wire 100, for example, by a radar. As an example, a sensor configured to detect the wire 100 by using a detection wave at a frequency equal to or higher than an extremely high frequency.

Figure 4A:
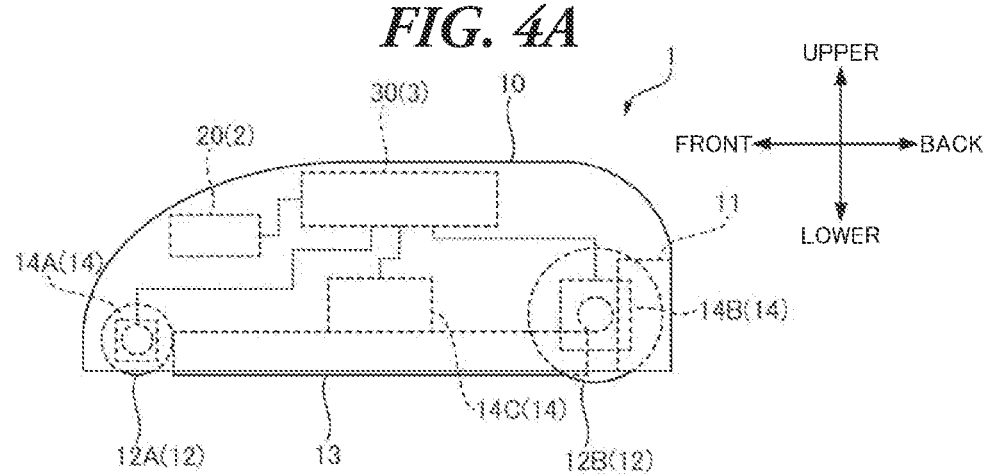
FIG. 4A is a side view illustrating a working robot.
Figure 4B:
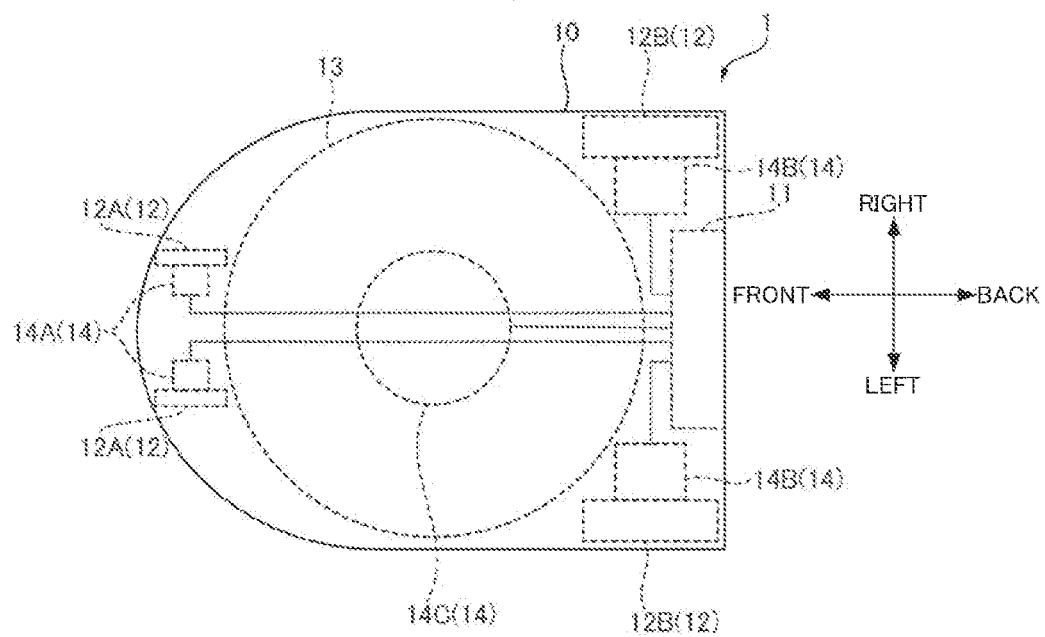
FIG. 4B is a plan view illustrating the working robot.

A more concrete example of the configuration of the working robot 1 will be described with reference to FIGS. 4A and 4B. The illustrated working robot 1 includes a battery 11 in the body 10, and traveling members 12 configured to allow the autonomous travel by supplying the electricity from the battery 11. In addition, the body 10 includes a working device 13 configured to perform the work along a traveling route of the body 10. Moreover, the working robot 1 includes the controller 30 configured to control the traveling members 12 and the working device 13. The illustrated traveling members 12 of the working robot 1 include front wheel traveling members 12A and rear wheel traveling members 12B, and are configured to allow the body 10 to autonomously travel toward any direction within the area surrounded by the wire 100.

The body 10 of the working robot 1 includes actuators 14 configured to actuate the traveling members 12 and the working device 13. The actuators 14 include a pair of right and left front wheel actuators 14A, a pair of right and left rear wheel actuators 14B, and a working actuator 14C configured to actuate the working device 13. The battery 11 is a power source for the actuators 14, the controller 30 and so forth.

The working device 13 of the working robot 1 is configured to perform mowing work to mow lawn and weeds, or collection work to collect balls, so that a working track is formed along the traveling route of the body 10. Hereinafter, as an example, the working device 13 configured to perform the mowing work to mow lawn and weeds will be described. With the example illustrated in FIGS. 4A and 4B, the working device 3 has a circular working range in a plan view, and mows grass just under the working device 13 by rotating a mowing blade (not illustrated) around a vertical axis. Therefore, when the working device 13 is actuated while the body 10 is traveling, the working track through which the mowing work is done is formed along the traveling route of the working robot 1. The width of the working track is the diameter of the circular working range of the working device 13 in a plane view.

Figure 5:
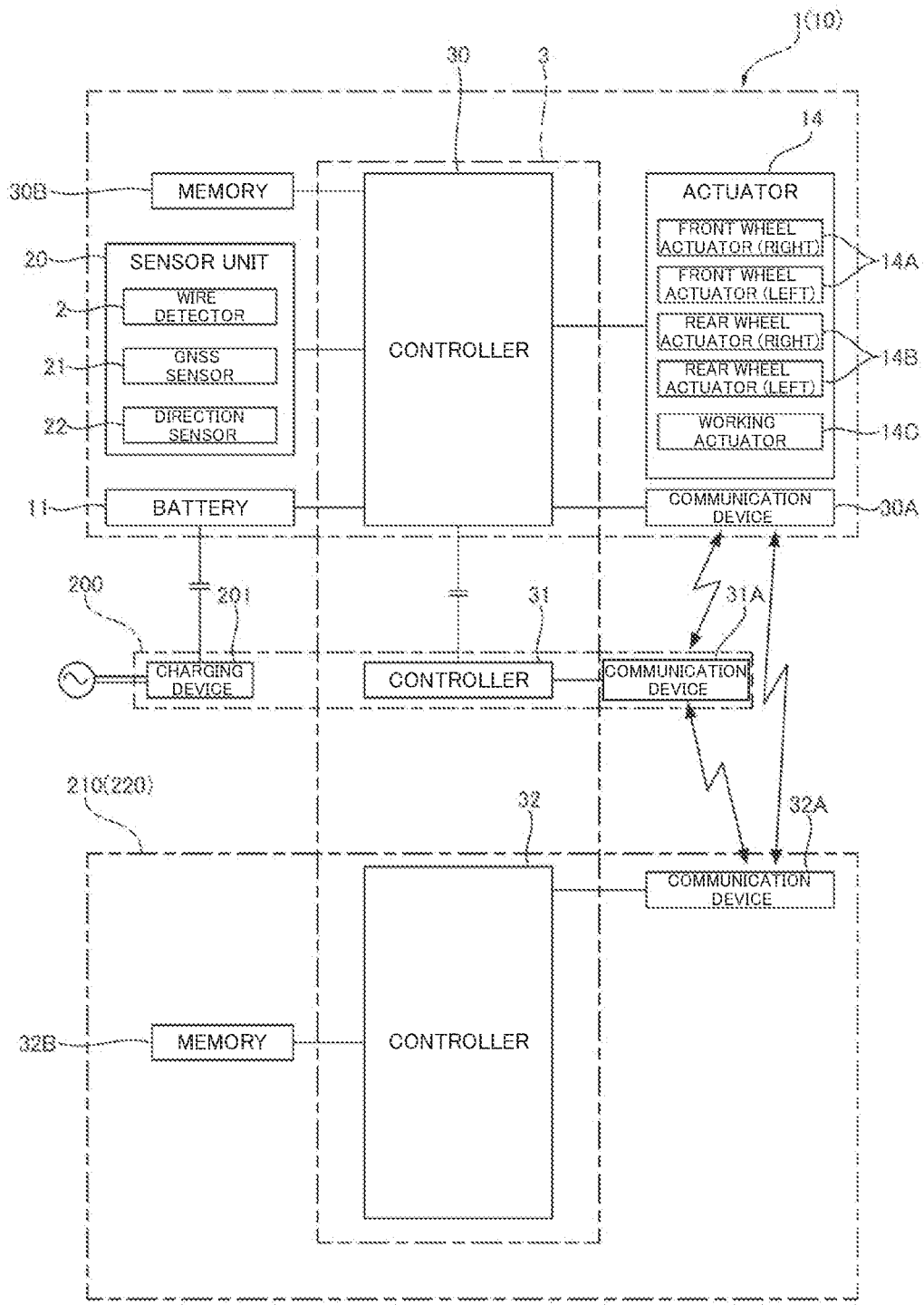
FIG. 5 illustrates a system configuration of the working robot system.

The working robot system S has a control system for the autonomous travel, which is established by the working robot 1, the charging station 200 including a charging device 201, and a management server 210 or a personal digital assistant 220 belonging to a worker, for example, as illustrated in FIG. 5. With the example illustrated in FIG. 5, the controller 30 of the working robot 1, a controller 31 of the charging station 200, and a controller 32 of the management server 210 (or the personal digital assistant 220) include communication devices 30A, 31A, and 32A, respectively. The communication devices 30A, 31A, and 32A transmit and receive information to and from each other via a network or radio communication to establish the integrated controller 3 of the working robot system S. Each of the controllers 30, 31, and 32 includes a processor.

The sensor unit 20 including the wire detector 2 is provided in the body 10 of the working robot 1. For one thing, the autonomous travel of the working robot 1 is controlled by the controller 3 based on the detection signal from the wire detector 2. When the wire detector 2 detects the wire 100, and the body 10 is close to the wire 100, the controller 3 outputs a control command to the traveling members 12 to turn the body 10 to control the working robot 1 to autonomously travel within the area surrounded by the wire 100.

Meanwhile, the sensor unit 20 of the working robot 1 may include a Global Navigation Satellite System (GNSS) sensor 21 or a direction sensor 22 so as to be able to virtually set an area for the autonomous travel of the working robot 1 even without the detection signal to detect the wire 100. The virtual area for the autonomous travel is set by the controller 3, based on detection signals from the GNSS sensor 21 and the direction sensor 22, and map information stored in memories 30B and 32B.

Figure 6:
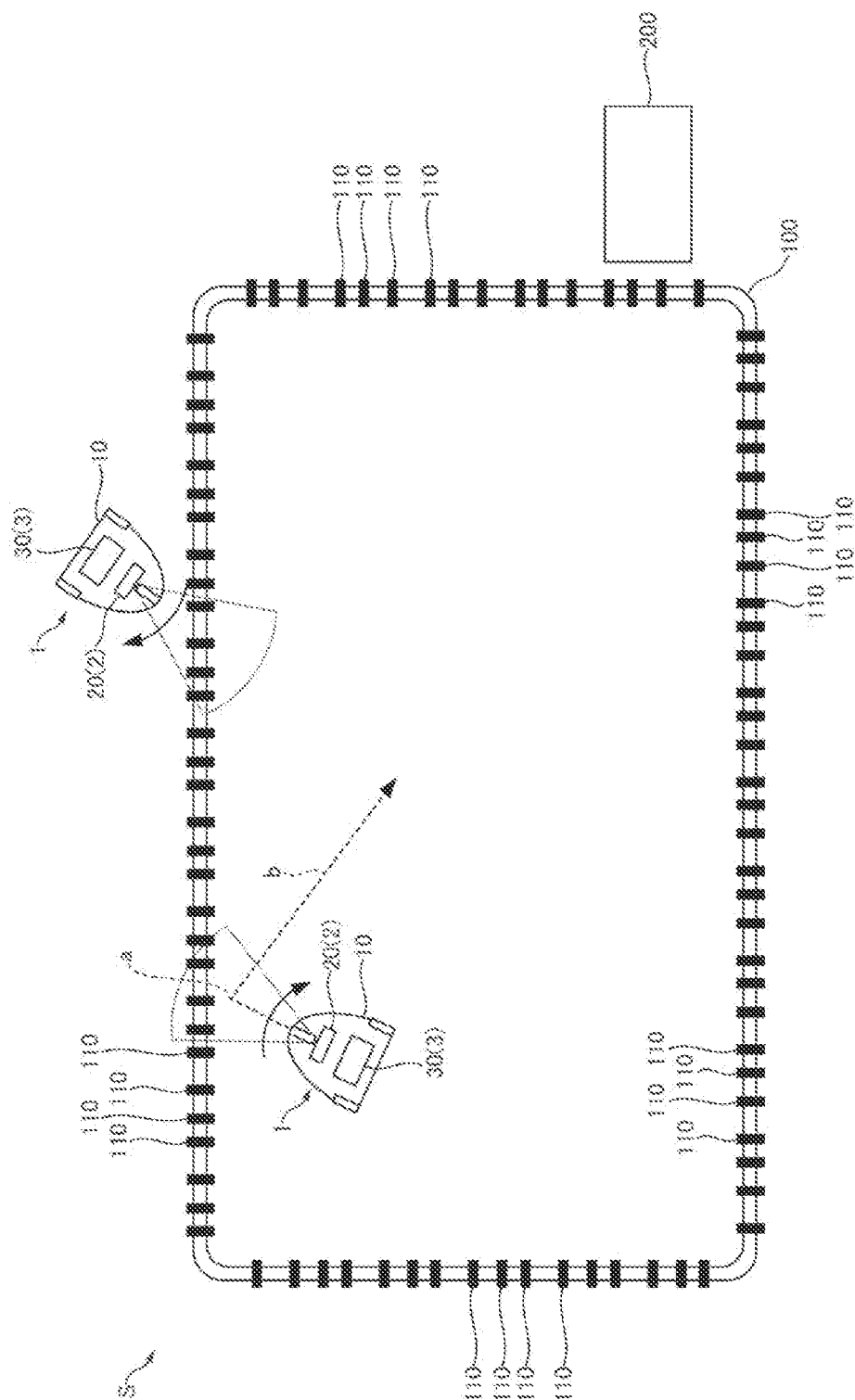
FIG. 6 illustrates another embodiment of the working robot system.

Another example of the configuration of the working robot system S will be described with reference to FIG. 6. With this example, the wire 100 includes detection markers 110 as a form feature. By this means, the controller 3 of the working robot system S can determine whether the working robot 1 exists inside or outside the area surrounded by the wire 100.

Figure 7A:
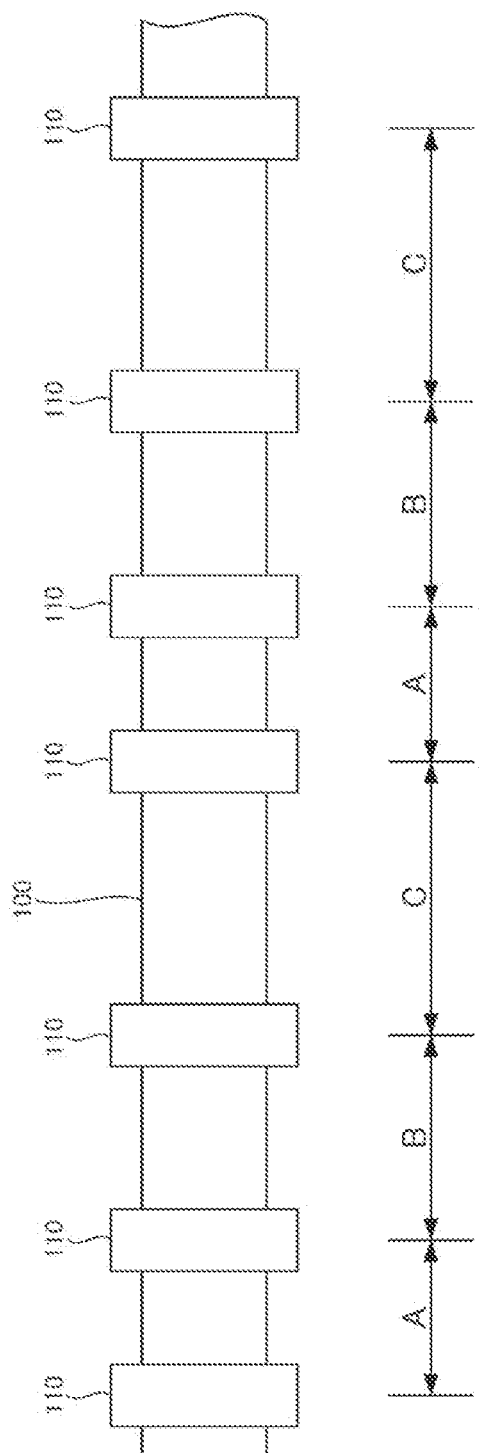
FIG. 7A is an external view illustrating a wire with detection markers.
Figure 7B:
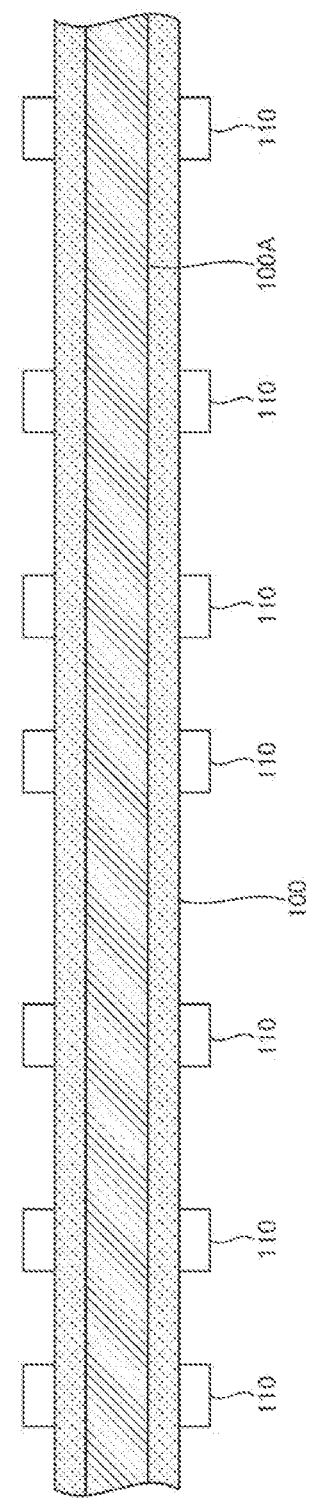
FIG. 7B is a cross-sectional view illustrating the wire with detection markers.

A plurality of detection markers 110 are provided along the longitudinal direction of the wire 100. The detection markers 110 are parts made of a material (for example, metal) which can be detected by the wire detector 2, and are attached to the outer surface of the wire 100. As illustrated in FIGS. 7A and 7B, the distances A, B, C each between two of the four detection markers 110 continuously arranged are different from each other (for example, A<B<C). In addition, a core 100A made of a material (for example, metal) which can be detected by the wire detector 2 is provided inside the wire 100 if necessary.

For the wire 100 with these detection markers 110, the wire detector 2 of the working robot 1 has a function to scan detection waves in one direction (for example, clockwise). For example, when the distances between the detection markers 110 detected by the scanning of the detection waves are in the order of (A, B, C), (B, C, A), or (C, A, B), the controller 3 determines that the working robot 1 exists inside the area surrounded by the wire 100. Meanwhile, when the distances between the detection markers 110 detected are in the order of (C, B, A), (B, A, C), or (A, C, B), the controller 3 determines that the working robot 1 exists outside the area surrounded by the wire 100.

Figure 8:
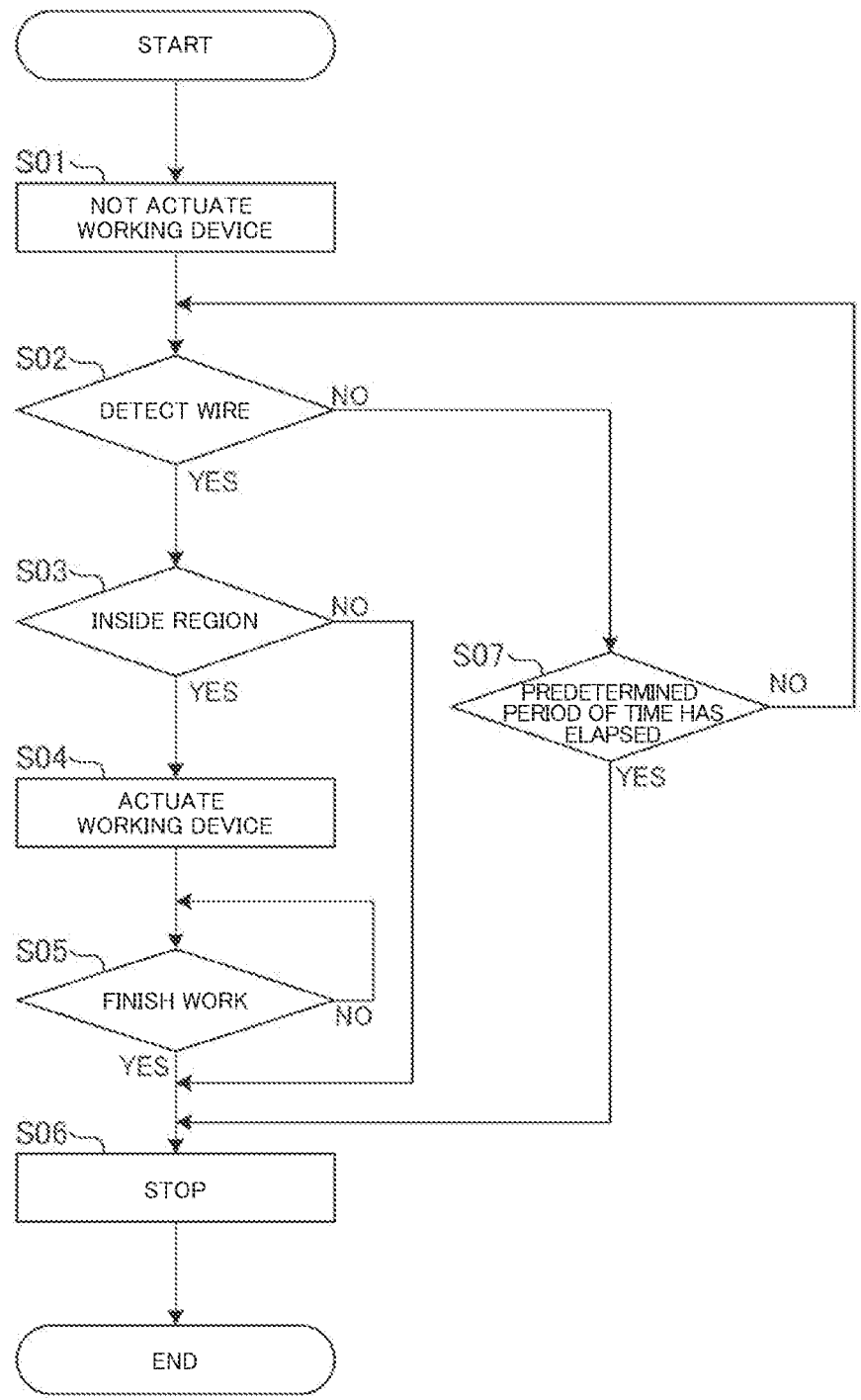
FIG. 8 illustrates an example of control flow of the working robot system.

This working robot system S allows the working robot 1 to autonomously travel, for example, according to the control flow described below. That is, as illustrated in FIG. 8, after the start of the control, the controller 3 of the working robot 1 does not actuate the working device 13 to perform the predetermined work, but first causes the working robot 1 to turn (step S01) toward the direction (for example, to a location a in FIG. 6) to detect the wire 10 based on the detection waves of the wire detector 2. When the wire 100 is detected (step S02: YES), the detection waves are scanned by the wire detector 2 as described above. Then, it is determined whether the working robot 1 exists inside the area surrounded by the wire 100 based on the form feature of the wire 100 (step S03).

Further, when the working robot 1 turns to the location (for example, the location a in FIG. 6) where the wire 100 is detected based on the detection waves by the wire detector 2, and the wire 100 cannot be detected (step S02: NO), the detection of the wire 100 is continued until a predetermined period of time has elapsed (step S07: NO). Then, when the state in which the wire 100 cannot be detected is continued and the predetermined period of time has elapsed (step S07: YES), the controller 3 causes the working robot 1 to stop (step S06).

When the wire 100 is detected (step S02: YES), and in step S03, it is determined that the working robot 1 exists inside the area surrounded by the wire 100 (step S03: YES), the controller 3 controls the working device 13 to perform the predetermined work (step S04). The controller 3 also controls the traveling members 12 to turn the working robot 1 at a predetermined angle, for example, in the location a in FIG. 6, and to cause the working robot 1 to travel into the area as indicated by an arrow b in FIG. 6 (step S04). Meanwhile, when it is determined that the working robot 1 exists outside the area surrounded by the wire 100 in the step S03 (step S03: NO), the controller 3 causes the working robot 1 to stop (step S06).

Then, the working robot 1 continues to perform the predetermined work until the working robot 1 finishes the predetermined work, or the user stops the working robot 1 (step S05: NO).

Figure 9:
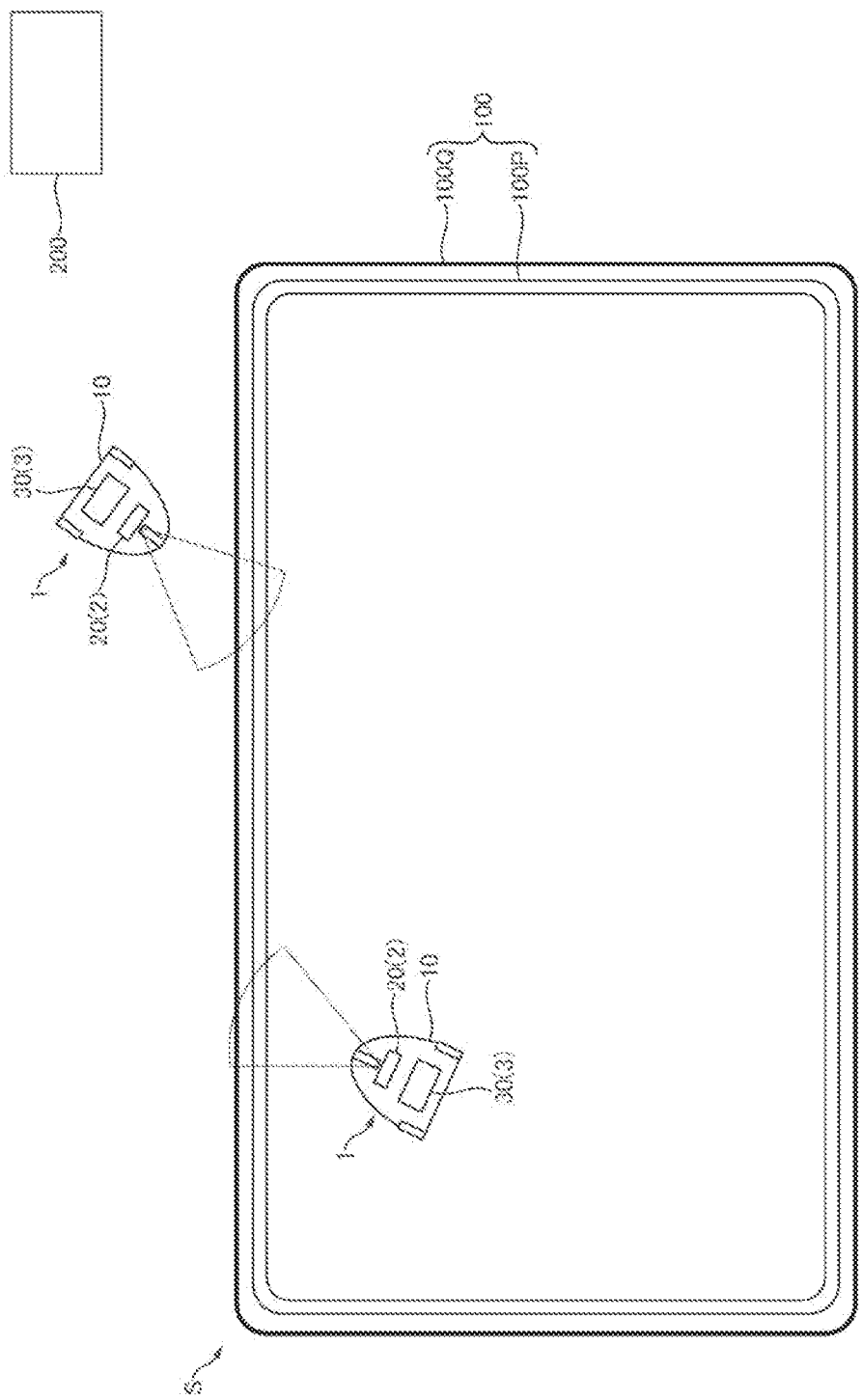
FIG. 9 illustrates another embodiment of the working robot system.

FIG. 9 illustrates another example of the configuration where the controller 3 determines whether the working robot 1 exists inside or outside the area surrounded by the wire 100, based on the form feature of the wire 100. With this example, the wire 100 is combination of a wire 100P which is thick in diameter and a wire 100Q which is thin in diameter. One of them is disposed outside the area surrounded by the wire 100, and the other is disposed inside the area surrounded by the wire 100 (with the illustrated example, the thin wire 100Q is disposed outside and the thick wire 100P is disposed inside, but vice versa is possible).

With the example illustrated in FIG. 9, when it is detected that the detection wave transmitted to the wire 100 is first reflected by the thick wire 100P, and then reflected by the thin wire 100Q, it can be determined that the working robot 1 exists inside the area. On the other hand, when it is detected that the detection wave transmitted to the wire 100 is first reflected by the thin wire 100Q, and then reflected by the thick wire 100P, it can be determined that the working robot 1 exists outside the area.

The form features of the wire are not limited to those examples. As another example, the wire 100 surrounding the area has such a form feature that one of the outer surface of the wire 100 facing the inside of the area and the outer surface of the wire 100 facing the outside of the area is uneven. By this means, the controller 3 of the working robot system S can determine whether the working robot 1 exists outside or inside the area surrounded by the wire 100.

As described above, the working robot system S according to the embodiments of the invention partitions the working area or the active area of the working robot 1 by using the non-energization wire 100. The working robot 1 includes the wire detector 2 configured to be able to detect the non-energization wire 100, and the working robot system S includes the controller 3 configured to control the working robot 1 to autonomously travel within the area partitioned by the wire 100 based on the detection signal from the wire detector 2.

By this means, the working robot system S can partition the working area in any location by using the wire 100, regardless of the power supply facility or the power source. In addition, even when a trouble such as blackout or breaking occurs, the working robot system S can continue the work of the working robot 1 in the area partitioned by the wire 100 regardless of the trouble.

In this case, the setting of the area by using the wire 100 can be combined with the conventional setting of the area by using a beacon or the virtual setting of the area by using GNSS positioning. For example, the boundary of the active area which defines the most outside of the range of activity of the working robot 1 may be set by the beacon, and one or more working areas (the areas targeted for the work of the working robot 1) to be set inside the active area may be set by the wire 100. In contrast, the boundary of the active area may be set by the wire 100, and the working areas to be set inside the active area may be set as a virtual area by utilizing the beacon or GNSS positioning.

As the wire detector 2 of the working robot 1, the wire detection sensor configured to transmit a detection wave from a radar to the wire 100, and receive a reflected wave from the wire 100 can be used. As an example, a sensor (for example, a millimeter wave sensor) configured to detect the wire 100 at a frequency equal to or higher than an extremely high frequency. By using the millimeter wave sensor, it is possible to precisely detect the wire 100, and even through the detected part of the wire 100 is made of metal, it is possible to eliminate error detection that metal dust in the ground is erroneously detected as the wire 100.

In addition, as described above, the wire 100 of the working robot system S is not electrically connected to the charging station (power supply facility) 200 configured to charge the working robot 1. Therefore, it is possible to install a charging facility anywhere inside and outside the area surrounded by the wire 100 as long as a terminal connected to the charging facility to charge the battery 11 of the working robot can be connected to a connecting terminal of the charging facility there.

Moreover, as described above, the working robot system S can determine whether the working robot 1 exists outside or inside the area surrounded by the wire 100 based on the form features of the wire 100. By this means, it is possible to cause the working device 13 of the working robot 1 to be actuated only within the area surrounded by the wire 100, and therefore to cause the working robot 1 to perform the work only within the safe area.

The controller 3 may control the traveling members 12 to increase the traveling speed of the working robot 1 only within the area surrounded by the wire 100. By this means, it is possible to improve the work efficiency in the safe area. Furthermore, when a plurality of working robots 1 are centrally controlled, it is possible to achieve efficient management in such a way that only the working robot 1 in the working area surrounded by the wire 100 autonomously travels, and the working robot 1 outside the working area is stopped.

As described above, according to the working robot system having the above-described features, it is possible to solve the problem that the working robot cannot recognize the area, and to allow the working robot to continue the work in a stable manner.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A working robot system comprising:
    a working robot configured to perform work while autonomously traveling;
    a non-energization wire configured to partition a working area or an active area of the working robot; and
    a controller,
    wherein:
    the working robot includes a wire detector configured to detect the wire;
    the controller includes a processor;
    the processor is configured to control the working robot to autonomously travel within an area partitioned by the wire, based on a detection signal from the wire detector;
    the wire detector is a wire detection sensor configured to transmit a detection wave to the wire and receive a reflected wave from the wire;
    the wire detection sensor is a sensor for radar detection at a frequency equal to or higher than an extremely high frequency;
    the wire has a form feature to determine whether the working robot exists inside or outside the area surrounded by the wire;
    the form feature is that:
        detection markers are continuously arranged at different intervals along a longitudinal direction of the wire,
        the wire includes a combination of a wire that is thick in diameter and a wire that is thin in diameter, or
        one of an outer surface of the wire facing the inside of the area and an outer surface of the wire facing the outside of the area is uneven; and
    the wire detector scans the detection wave and the processor determines whether the working robot exists inside the area surrounded by the wire based on the form feature of the wire.

2. The working robot system according to claim 1, wherein the wire is not electrically connected to a charging station.

3. The working robot system according to claim 1, further comprising a fixing member configured to fix one end and the other end of the wire to one another.

4. The working robot system according to claim 3, wherein the fixing member is configured to mechanically fix the wire.

5. The working robot system according to claim 1, wherein the working area or the active area is surrounded by one wire.

6. The working robot system according to claim 1, wherein the working area or the active area is surrounded by at least two wires.

7. The working robot system according to claim 1, wherein the wire is provided on a on a ground surface.

8. The working robot system according to claim 1, wherein the working robot is configured to perform work in a construction site, a ridge, an orchard, a mountain, a grassland, a garden, and a sports practice area.

9. The working robot system according to claim 8, the working robot is at least one of a lawn mower, a grass mower, and a ball picker.

* * * * *